Feb. 14, 1950     A. G. PARKER     2,497,415
SELF-LOCKING ACTUATING MECHANISM
Filed Sept. 28, 1945     5 Sheets-Sheet 1

INVENTOR
A. G. PARKER
BY Featherstonhaugh & Co.
ATTORNEYS

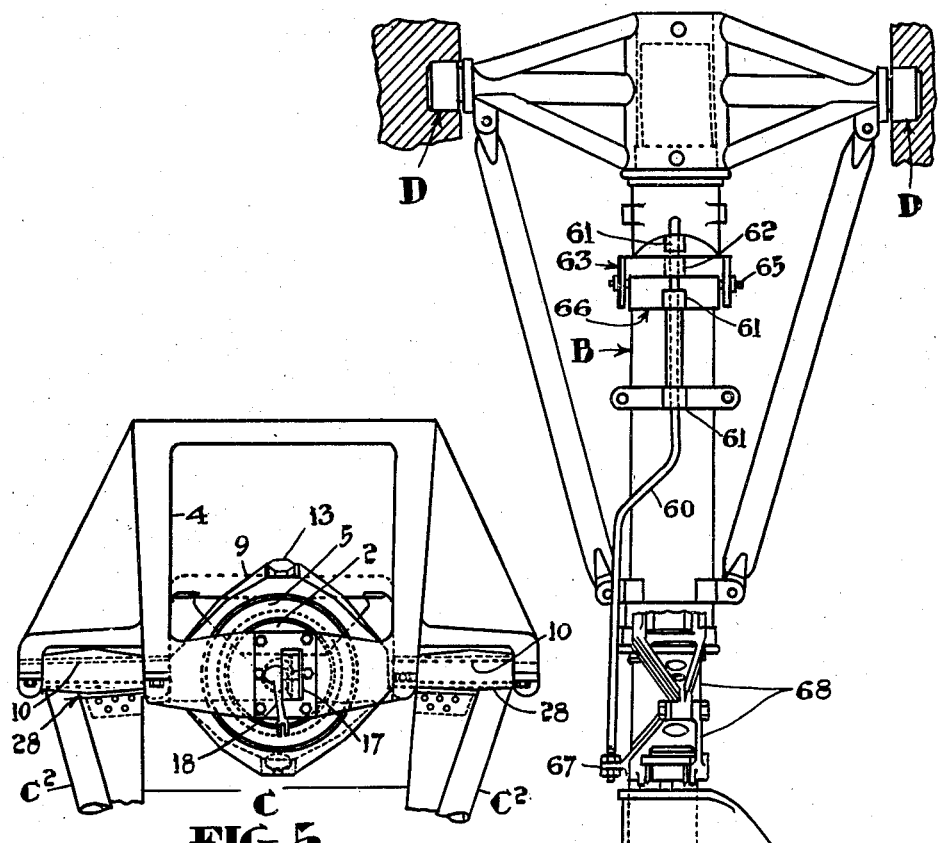
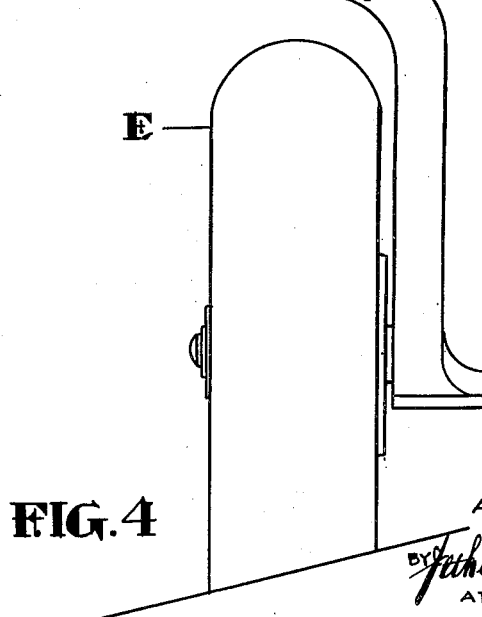
FIG. 5
FIG. 4

Feb. 14, 1950  A. G. PARKER  2,497,415
SELF-LOCKING ACTUATING MECHANISM
Filed Sept. 28, 1945  5 Sheets-Sheet 5
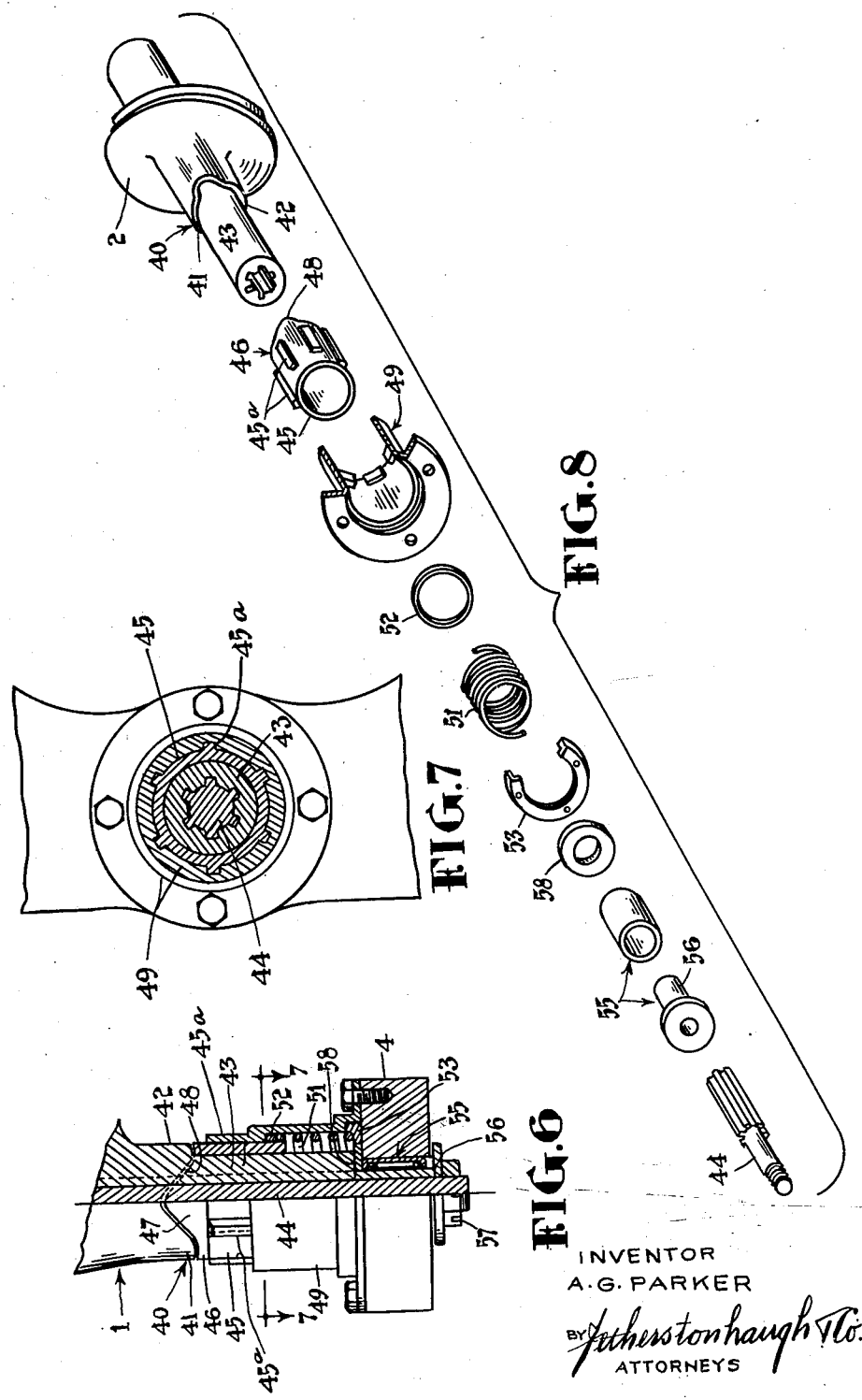
INVENTOR
A. G. PARKER
BY Fetherstonhaugh & Co.
ATTORNEYS Patented Feb. 14, 1950

2,497,415

UNITED STATES PATENT OFFICE 2,497,415

SELF-LOCKING ACTUATING MECHANISM

Arnold G. Parker, Longueuil, Quebec, Canada

Application September 28, 1945, Serial No. 619,162

16 Claims. (Cl. 244—102)

This invention relates to a self-locking actuating mechanism capable of wide application for actuating a part or element to different positions and automatically locking said part in each of said positions. More particularly, the invention comprises certain improvements in the design and application of self-locking actuating mechanisms of the swash plate or wobbler-disk type disclosed in my co-pending application Serial #605,309, filed July 16, 1945, which became Patent No. 2,438,182 on March 23, 1948.

In the present instance the invention will be described as embodied in an aircraft retractable landing gear assembly for raising and lowering the undercarriage and automatically locking it in either the up-position or the down-position. In this application thereof the invention provides important advantages as regards simplifying and improving the design and operating characteristics of aircraft retractable landing gear. It will, however, be apparent from the nature of the invention that it may also be advantageously employed for operating bomb doors and in various other relations.

Locking devices and actuating mechanisms for aircraft landing gear generally comprise a large number of interconnected parts, such as spring loaded catches, rollers, cams, locking pins, etc., which require fine precision fitting on assembly. These systems, as a general rule, require the dynamic or movable component to be locked to a static part of the frame structure of the aircraft. Frequently, deflection of said frame structure results in misalignment of the locking catches or other components of the locking mechanism which prevents proper engagement and disengagement thereof for locking and unlocking purposes and necessitates rigid inspection and testing at frequent intervals. The present invention eliminates these objections by the provision of an improved landing gear assembly in which a self-contained, self-locking control unit of the aforesaid swash plate or wobbler-disk type serves to actuate the undercarriage and automatically lock it in either the "up" or "down" position. The use of this inherently self-locking control unit makes possible the provision of a landing gear assembly which is lighter and has fewer parts than the conventional assembly; is simpler in design and operation; and is reliable and foolproof and cannot get out of adjustment.

Proceeding now to a more detailed description of the invention, reference will be had to the accompanying drawings, in which—

Fig. 4 is an enlarged rear view of a portion of the assembly shown in Fig. 1.

Fig. 5 is an enlarged view of the control unit embodied in the assembly shown in Fig. 1.

Fig. 6 is a detail view, partly in elevation and partly in section, of a cam arrangement for preventing unlocking of the control unit by vibration loads.

Fig. 7 is a sectional view along the section line 7—7 of Fig. 6.

Fig. 8 is an exploded view of the assembly shown in Fig. 6.

The landing gear assembly shown in the present drawings is of the forward retracting type. It comprises control unit A, wheel-carrying shock strut B of conventional, telescoping, oleo-pneumatic type mounted to swing about fixed pivots D located at its upper end, and collapsible V-brace nut cracker strut C which takes the fore and aft landing and braking loads imposed on shock strut B. The upper ends of struts B and C are operatively connected to component parts of control unit A as hereinafter described. A landing wheel E is carried by conventional wheel-mounting means provided at the lower end of strut B.

Control unit A includes shaft 1 mounting inclined wobble disk 2 which rotates with said shaft about axis A'—A'. The ends of shaft 1 are journalled in antifriction bearings 3 carried by stationary supporting bracket 4 rigidly secured to an appropriate part of the aircraft structure F.

The angle $a$ at which wobble disk 2 is set in relation to shaft 1 varies with different applications and depends on the angle of travel necessary for actuation of the parts operated by the control unit. In the present instance the angular setting of disk 2 on shaft 1 is predetermined so that upper section $C^2$ of strut C, which is operated by said unit, will be swung through an included angle $b$ of approximately 45° during raising or lowering of the landing gear.

Figure 2:
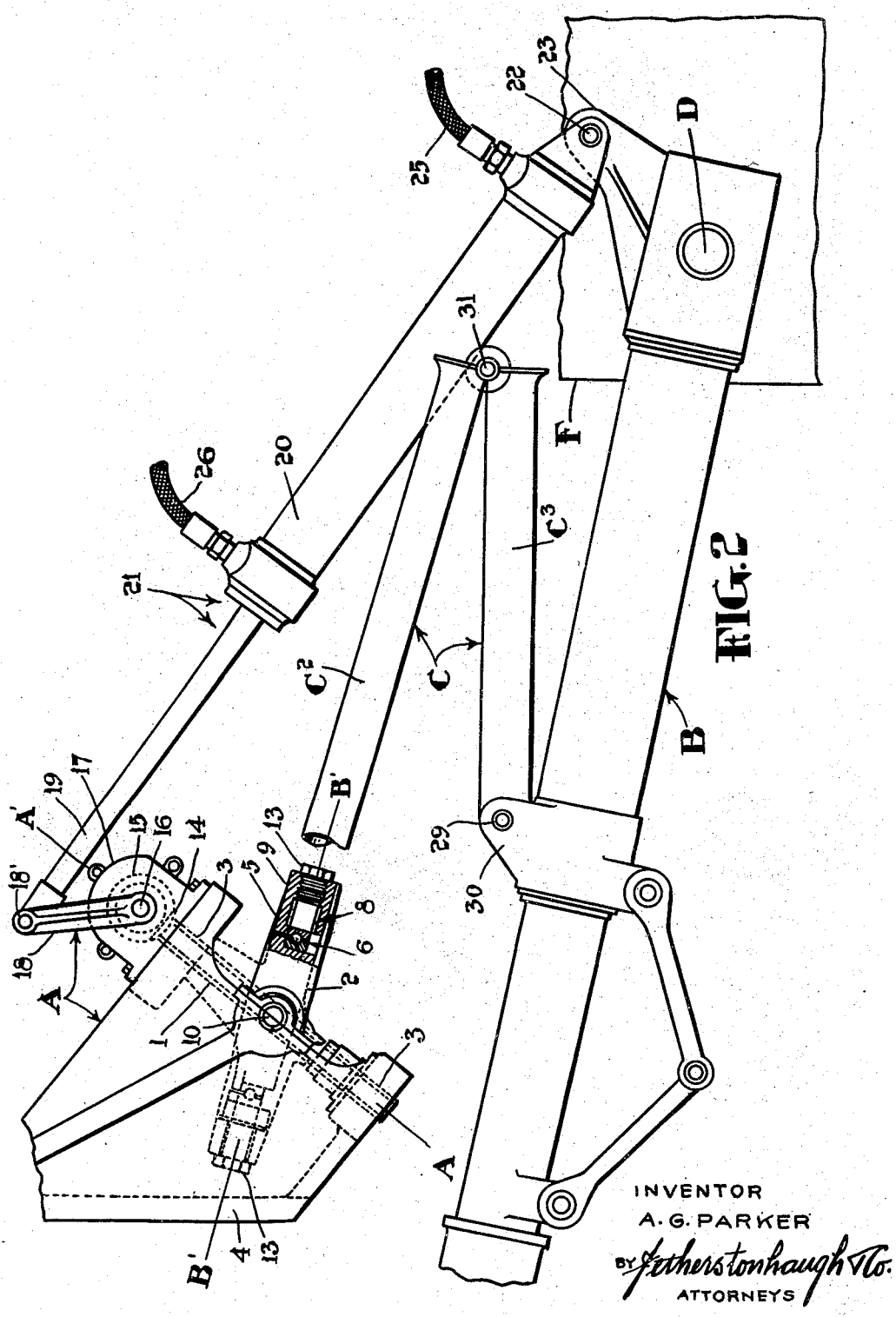
Fig. 2 is a side view showing the landing gear assembly as it appears locked in the "up" position.

An intermediate driving ring 5 forming part of control unit A encircles the periphery of disk 2 and is mounted thereon by a ball type antifriction thrust and radial bearing 6 which maintains the disk and driving ring in co-planar relationship while permitting rotation of the disk relative to said ring. Driving ring 5 is mounted to rotate on axis B'—B' (Fig. 2) in response to rotation of shaft 1 and disk 2 on axis A'—A'. In this connection it will be noted that ring 5 is provided with diametrically opposite anti-friction bearings 8 in which are fitted the inner ends of two driving pins 13 extending inwardly through yoke 9 which encircles ring 5 and constitutes the driven member of control unit A. Pins 13 are stationary in yoke 9 and the latter is mounted to rotate on axis C'—C' by two shaft extensions 10 journalled in anti-friction bearings 11 and 12 afforded by bracket 4.

From the foregoing description of control unit A it will be seen that ring 5, while retained in co-planar relationship with disk 2 by anti-friction bearings 6, is caused to rotate on axis B'—B' and also on axis C'—C' in response to rotation of shaft 1 and disk 2 on axis A'—A'. When ring 5 is rotated on axis C'—C' by disk 2 it imparts swinging or oscillating movement to yoke 9 about axis C'—C'.

Shaft 1 is preferably operated so that it has a total angular travel of 180° from one extreme position in which the landing gear is fully raised to another extreme position in which the landing gear is fully lowered. When shaft 1 is rotated to either of these extreme positions unit A becomes self-locking owing to the fact that driving ring 5 and yoke 9 assume a dead center co-planar position in which vibration or other loads transferred to ring 5 and disk 2 through yoke or driven member 9 are ineffective to rotate shaft 1. This inherent self-locking characteristic of unit A in no way interferes with operation of said unit in response to rotation of shaft 1 by the normal shaft-operating means directly connected to said shaft.

The means shown for operating shaft 1 of control unit A comprises bevel gear 14 fixed to one end of shaft 1 and meshing with bevel gear 15 carried by shaft 16 journalled in gear housing 17 supported by bracket 4. Shaft 16 is provided with operating lever 18 which is connected by pivot 18' to the piston rod 19 of a piston (not shown) operating in cylinder 20 of hydraulic jack 21. The end of cylinder 20 remote from gear housing 17 is connected by pivot 22 to lever arm 23 which is part of the upper yoke of shock strut B.

Jack 21 is extended when the undercarriage is in the "up" position and is fully compressed or retracted when the undercarriage is in the "down" position. Extension of jack 21 is accomplished by supplying pressure fluid to the lower end of cylinder 20 through fluid connection 25 and simultaneously exhausting pressure fluid from the upper end of said cylinder through fluid conduit 26. The jack is retracted by reversing the routing of the pressure fluid so that pressure fluid is supplied to the upper end of cylinder 20 through fluid conduit 26 and is simultaneously exhausted from the lower end of said cylinder through fluid conduit 25. Each of the conduits 25 and 26 is alternately connected by suitable valve mechanism (not shown) to exhaust or to a pump or other source of pressure fluid.

Figure 3:
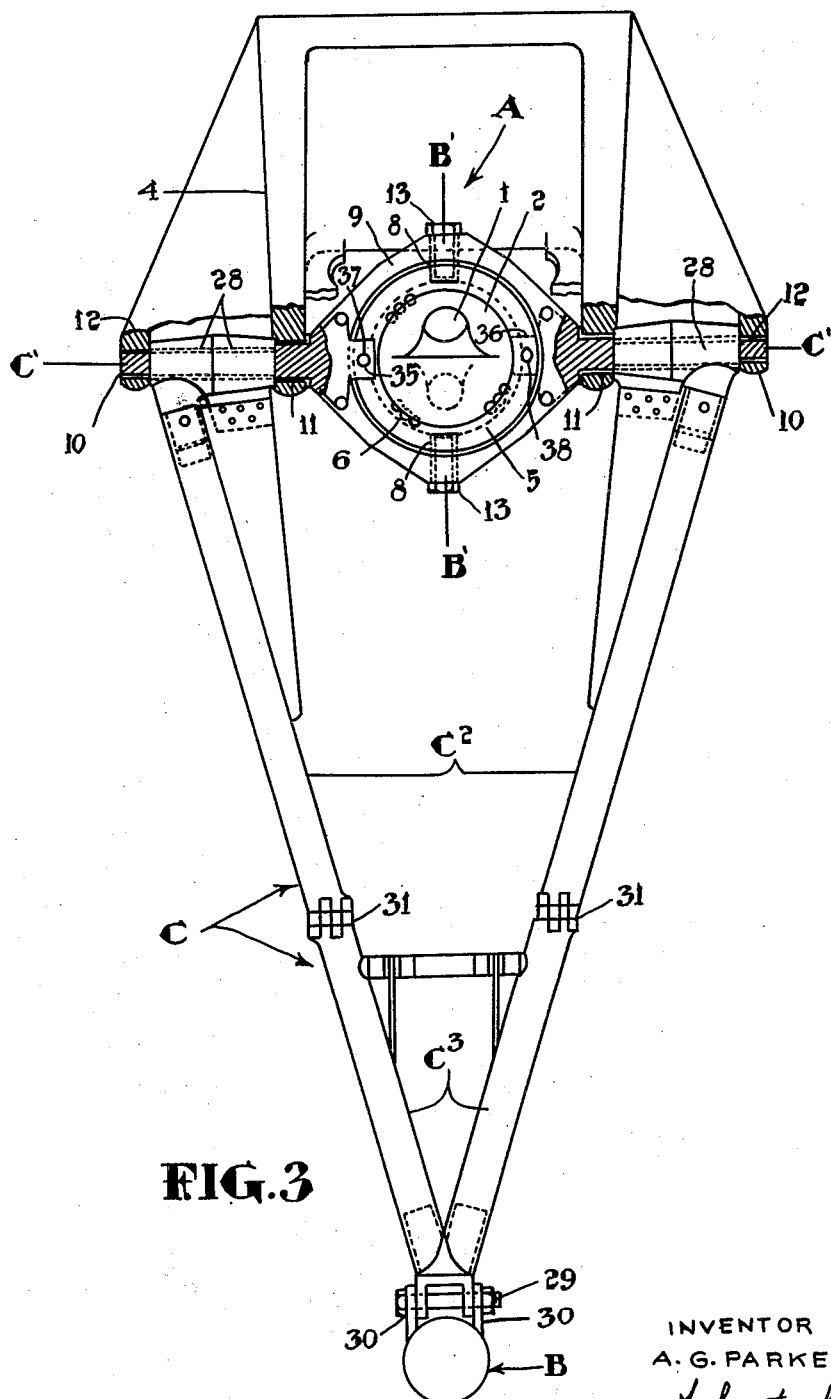
Fig. 3 is an enlarged view showing the component parts of the self-locking control unit and the connection between the control unit and the nut-cracker strut of the undercarriage.

Upper section $C^2$ of V-brace strut C is provided with extensions 28 (Figs. 3 and 5) fitted on and splined to shaft extensions 10 of yoke 9. The lower end of section $C^3$ of V-brace strut C is fastened by pivot 29 to lugs 30 carried by shock strut B. Sections $C^2$ and $C^3$ of V-brace strut C are joined together by pivots 31 located slightly over dead centre of the centre line of the V-brace strut C when the latter is fully extended.

Figure 1:
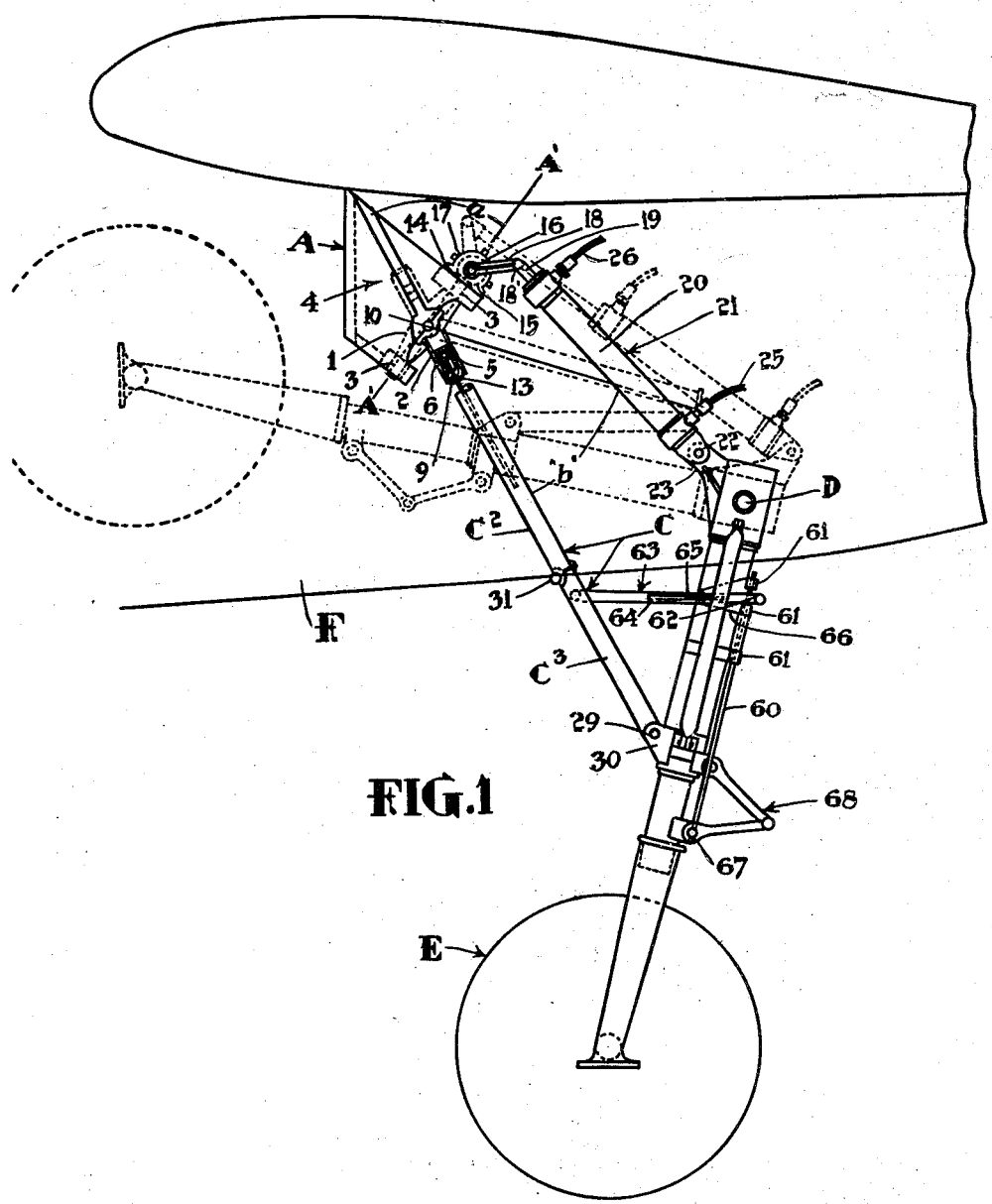
Fig. 1 is a side elevation of a landing gear assembly embodying my invention. In this view the undercarriage is shown locked in the "down" position.

When the undercarriage is in the "down" position shown in Fig. 1, V-brace strut C is fully extended; hydraulic jack 21 is fully compressed or retracted; and driving ring 5 and yoke 9 of control unit A are disposed in co-planar relationship with each other so that vibration or other loads transmitted to disk 2 and shaft 1 of unit A through strut C and yoke 9 are ineffective to rotate shaft 1 in a direction to permit collapse of strut C. It will also be noted that, in the "down" position of the undercarriage, jack pivots 18' and 22 are on dead centre with each other and with fixed fulcrum D of shock strut B.

The full retraction of jack 21 in the "down" position of the undercarriage is an important feature since, in the event of premature retraction of the undercarriage during take-off with the aircraft partly airborne, the jack rods receive violent impact loads through the mechanism from the ground when the down catch lock is unlocked. On most conventional undercarriages the retracting jack is extended under these conditions resulting in failure of the jack rods due to the fact that restriction of the flow of pressure fluid causes excessive crippling loads to be applied. The invention is however obviously applicable in cases when the jack is fully extended in the down position.

In raising or retracting the undercarriage from the "down" position shown in Fig. 1, jack 21 is extended by supplying pressure fluid to the lower end of cylinder 20 through fluid conduit 25 and simultaneously exhausting pressure fluid from the upper end of said cylinder through fluid conduit 26. Owing to the dead centre alignment of jack pivots 18' and 22 with the fixed fulcrum D of shock strut B the initial extension of the jack is ineffective to swing the shock strut B about its fulcrum D but is effective to operate shaft 1 of control unit A through the agency of lever 18 and gears 15 and 14. This initial operation of shaft 1 of control unit A serves, through disk 2, to rotate ring 5 on axis B'—B' relative to yoke 9, thereby disrupting the previously established co-planar locking relationship of ring 5 and yoke 9 and releasing control unit A from its locked condition. The aforesaid initial movement of shaft 1 by hydraulic jack 21 also results in rotation of yoke 9 on axis C'—C' in a direction to break strut C at joints 31 and initiate upward retracting motion of struts C and B.

During this initial stage of the retracting operation the retracting load is transmitted from jack 21 through lever 18 and the load transmitting parts of control unit A to the upper section $C^2$ of V-brace C. When the undercarriage is partially retracted the lever arm 23 of strut B is shifted to a favorable leverage position in which it also takes the retracting loads from the operating jack. From then on the load is applied simultaneously at both ends of the jack and is distributed between the two points of application at lever 18 and lever arm 23 until the undercarriage is fully retracted. At this point the control unit cycle is completed by rotation of shaft 1 to a control unit locking position in which ring 5 and yoke 9 are disposed in a co-planar locking position in which vibration or other loads transmitted to disk 2 through V-brace C and yoke 9 are ineffective to rotate shaft 1.

In operating the undercarriage from the "up" position to the "down" position the initial travel of jack 21 from fully extended to fully retracted condition serves to rotate shaft 1 in a direction to effect relative movement of ring 5 and yoke 9 from their co-planar control unit locking position, allowing shock strut B to fall and permitting V-brace strut C to close at the joints or knuckles 31. The cycle of operation of control unit A by which the undercarriage is fully lowered is completed when ring 5 and yoke 9 reach a co-planar position in which loads transmitted through V-brace strut C and yoke 9 to ring 5 and disk 2 are ineffective to rotate shaft 1.

An important feature of the arrangement described herein is that loading on control unit A is only a percentage of the actual total load needed for retraction. Upon extension of the hydraulic jack 21 at one end the loads are partially carried through the control unit and knuckle joints 31 of V-brace C to the load transmitting connection provided between struts C and B. The extension of jack 21 at the other end applies load to lever arm 23 of strut B and thus reduces the loading of control unit A so that the weight of the latter may be reduced accordingly. The control unit does not take the major landing or braking loads since these loads are taken directly into the aircraft structure via the main support assembly bracket 4.

Stop plates 35 and 36 (Fig. 3) are attached to opposite sides of yoke 9 and are disposed in the path of rotation of ring 5 about axis B'—B'. These stop plates are equipped with adjustable stop screws 37 and 38 which serve as limit stops engageable with ring 5 to prevent over-running of ring 5 and yoke 9 when operated to their co-planar control unit locking position by rotation of shaft 1.

Although control unit A described herein is inherently self-locking at each end of its operating cycle, it might be considered that vibration loads, in case of hydraulic failure of jack 21, may cause unlocking of the control unit by shifting of ring 5 and yoke 9 from their co-planar locking position. To prevent this the stops 37 and 38 may be adjusted to permit ring 5 to overrun the co-planar position with yoke 9 at each end of the operating cycle of the control unit until arrested by the stop 37 or 38 when it reaches a position which, for convenient description, is herein termed the "overlocking" position. When the undercarriage is in the "up" position the "overlocking" position of ring 5 is such that the acting forces due to the weight of the undercarriage tends to rotate ring 5 against the limit stops at the end of the undercarriage raising cycle of operation and thus serves to further lock the mechanism. When the undercarriage is in the "down" position the acting forces due to landing and braking loads tends to hold ring 5 against the limit stops at the end of the undercarriage lowering cycle of operation.

An alternative cam arrangement for preventing unlocking of the control unit A by loads transmitted to disk 2 through yoke 9 and ring 5 is illustrated by Figs. 6 to 8 inclusive. In this case a face cam 40 provided with two lobes 41 and 42 is formed on sleeve member 43 which rigidly carries disk 2 and is splined to a shaft element 44. Sleeve 43 and shaft element 44 conjointly provide the shaft assembly generally indicated at 1. A sliding cam sleeve 45 is fitted on sleeve 43 and is formed with a face cam 46 which is provided with lobes 47 and 48 and engages with cam 40. Cam sleeve 45 slides in and is splined to housing 49 bolted to one of the bearing supports afforded by bracket 4. Cam sleeve 45 is loaded by spring 51 arranged in housing 49 so that the lobes of cams 40 and 46 are interlocked at each end of the cycle of operation of the control unit to prevent displacement of yoke 9 and ring 5 from their co-planar locking position by loads transmitted to disk 2 through said yoke and ring. The thrust of spring 51 is transmitted to the splines 45a of cam sleeve 45 through a thrust washer 52 against which the inner end of the spring bears. The outer end of spring 51 bears against a spring seat member 53 which is screwed into the outer end of housing 49.

Each end of shaft element 44 of shaft assembly 1 is journalled in bracket 4 by antifriction bearing 55, the inner race 56 of which is clamped in place between sleeve 43 and clamping nut 57 threaded on shaft 1. A thrust-bearing washer 58 is interposed between sleeve 43 and bracket 4.

While a very desirable distribution of the retracting loads is obtained by connecting hydraulic jack 21 between lever 18 and lever arm 23 it will be apparent that this arrangement is not an indispensable feature of the invention and that jack 21 may be arranged to operate only the lever 18. It will also be understood that electric or any other suitable mechanism for operating shaft 1 of control unit A may be substituted for jack 21. It will also be understood that any suitable emergency operating means may be provided for operating the shaft of control unit A in event of failure of the normal operating means. Control unit A also lends itself to the use of warning devices for indicating, by signal lights or otherwise, that the undercarriage is safely locked down before landing. Such warning devices could be actuated, for example, by switch mechanism operating in response to positioning of ring 5 and yoke 9 in the co-planar control unit locking position.

The undercarriage may be provided with any suitable form of ground lock to prevent collapse of V-brace strut C in the event that jack 21 is inadvertently operated on the ground. In the present instance I have shown a ground lock including a shear pin 60 (Figs. 1 and 4) which, in the static loaded condition of shock strut B, passes through pin-receiving lugs 61 carried by shock strut B and also through a pin receiving lug 62 carried by the bight portion of a U-shaped locking yoke 63 which straddles shock strut B. The side arms of yoke 63 are attached to section C³ of V-brace C and are slotted at 64 to receive guide pin 65 carried by clamp 66 attached to shock strut B. The lower end of pin 60 is connected to and moves with the lower pivot 67 of toggle 68 connected between the telescoping parts of shock strut B. When strut B and toggle 68 are fully extended pin 60 is withdrawn from lug 62 of yoke 63 thereby unlocking said yoke to permit collapse of strut C during the undercarriage raising operation of control unit A.

I claim:

1. In self-locking actuating mechanism of the character described, a motion-transmitting unit comprising a shaft, means mounting said shaft for rotation on its central longitudinal axis, an inclined disk carried by the shaft and fixed to rotate therewith, a yoke through which said shaft extends, means mounting said yoke for swinging movement about an axis intersecting said shaft axis at right angles thereto and passing through the disk-carrying portion of the shaft, means interconnecting said yoke and disk so that swinging movement is imparted to the yoke by the disk in response to rotation of the shaft, shaft operating means through which force is applied directly to said shaft to rotate it through a partial revolution to either of two predetermined positions of rest in which the disk and yoke are disposed in a co-planar position in which loads transmitted to the shaft through said yoke and disk are ineffective to rotate the shaft on its axis, means for preventing relative displacement of the yoke and disk from their co-planar relationship by vibration loads without interfering with normal operation of the shaft by said shaft operating means.

2. A motion-transmitting unit as set forth in claim 1, in which the last mentioned means comprises a holding cam carried by and rotatable with said shaft, and a second spring-loaded cooperating holding cam slidably mounted on said shaft but held against rotation therewith, said cams engaging each other to resist rotation of said shaft by vibration loads when the shaft is at rest with the yoke and disk in co-planar relationship.

3. In self-locking actuating mechanism of the character described, a motion-transmitting unit comprising a shaft, means mounting said shaft for rotation on its central longitudinal axis, an inclined disk carried by the shaft and fixed to rotate therewith, a yoke through which said shaft extends, means mounting said yoke for swinging movement about an axis intersecting said shaft axis at right angles thereto and passing through the disk-carrying portion of the shaft, means interconnecting said yoke and disk so that swinging movement is imparted to the yoke by said disk in response to rotation of the shaft, said means including a ring rotatably fitted on the peripheral portion of said disk, shaft operating means through which force is applied directly to said shaft to rotate it through a partial revolution to either of two predetermined extreme positions of rest in which the disk and yoke are disposed in a co-planar position in which loads transmitted to the shaft through the yoke and the means connecting the yoke to the disk are ineffective to rotate the shaft on its axis and stop means carried by the yoke and arranged to engage said ring to prevent the yoke and disk over-running the co-planar positions to which they are operated in response to rotation of said shaft by said shaft operating means.

4. A motion-transmitting unit as set forth in claim 3, including means for preventing relative displacement of the yoke and disk from their co-planar relationship by vibration loads without interfering with normal operation of the shaft by said shaft-operating means.

5. A motion-transmitting unit as set forth in claim 3, including a holding cam carried by and rotatable with said shaft and a second spring-loaded cooperating holding cam slidably mounted on said shaft but held against rotation therewith, said cams engaging with each other when the shaft is at rest with the yoke and disk in co-planar position to prevent rotation of said shaft by vibration loads.

6. A motion-transmitting unit as set forth in claim 3, in which said stop means comprises ring-engaging stops carried by opposite sides of said yoke and disposed in the path of angular movement of said ring relative to said yoke.

7. In self-locking actuating mechanism of the character described, a motion-transmitting unit comprising a shaft, means mounting said shaft for rotation on its central longitudinal axis, an inclined disk carried by the shaft and fixed to rotate therewith, a yoke through which said shaft extends, means mounting said yoke for swinging movement about an axis intersecting said shaft axis at right angles thereto and passing through the disk-carrying portion of the shaft, means interconnecting said yoke and disk so that swinging movement is imparted to the yoke by said disk in response to rotation of the shaft, said means including a ring rotatably fitted on the peripheral portion of said disk, stops carried by the yoke and engageable with said ring to prevent continuous rotation of the shaft when the disk is disposed in a predetermined position relative to the yoke by rotation of the shaft in one direction, said stops being also engageable with the ring to prevent continued rotation of the shaft when the disk is moved to a second predetermined position relative to the yoke by rotation of the shaft in the reverse direction.

8. A motion-transmitting unit as set forth in claim 7, in which each of said stops comprises a stop plate arranged in the path of angular movement of the ring relative to the yoke on an axis which intersects the shaft and yoke axes and is perpendicular thereto, and an adjustable ring-engaging stop screw carried by each of said stop plates.

9. In self-locking actuating mechanism of the character described, a motion-transmitting unit comprising a shaft, means mounting said shaft for rotation on its central longitudinal axis, an inclined wobbler-disk carried by the shaft and fixed to rotate therewith, a yoke through which said shaft extends, means mounting said yoke for swinging movement about an axis intersecting said shaft axis at right angles thereto and passing through the disk-carrying portion of the shaft, motion-transmitting means interconnecting said yoke and disk so that swinging movement is imparted to the yoke by said disk in response to rotation of the shaft, said motion-transmitting means including a ring rotatably mounted on the peripheral portion of the disk and pivotally secured to said yoke to establish an axis intersecting and perpendicular to the yoke and shaft axes on which the disk is rotatable relative to said yoke, stop plates secured to said yoke at opposite sides of said disk and arranged in the path of angular motion of the ring relative to the yoke on the axis established by the motion-transmitting means interconnecting the yoke and disk, and shaft holding means operable when the shaft is at rest with the disk and yoke disposed in co-planar relationship to prevent rotation of said shaft by vibration loads without interfering with operation of said shaft by normal operating means directly connected therewith.

10. In self-locking actuating mechanism of the character described, a motion-transmitting unit comprising a shaft, means mounting said shaft for rotation on its central longitudinal axis, an inclined disk carried by the shaft and fixed to rotate therewith, a yoke through which said shaft extends, means mounting said yoke for swinging movement about an axis intersecting said shaft axis at right angles thereto and passing through the disk-carrying portion of the shaft, motion-transmitting means interconnecting said yoke and disk so that swinging movement is imparted to the yoke by said disk in response to rotation of the shaft, said motion-transmitting means including a ring rotatably fitted on the peripheral portion of said disk and pivotally secured to said yoke to establish an axis, intersecting and perpendicular to the yoke and shaft axes, on which the disk is rotatable relative to the yoke, ring-engaging stop plates carried by the yoke and arranged at opposite sides of the ring in the path of angular movement of the ring relative to the yoke on the ring axis which intersects the shaft and yoke axis, and adjustable stop screws carried by said plates and adapted to be adjusted so that, during rotation of the shaft in either direction, the stop screws will be engaged by the ring when the latter is rotated to or just slightly beyond a co-planar position with the yoke.

11. In self-locking actuating mechanism of the character described, a motion-transmitting unit comprising a shaft, means mounting said shaft for rotation on its central longitudinal axis, an inclined disk carried by the shaft and fixed to rotate therewith, a yoke through which said shaft extends, means mounting said yoke for swinging movement about an axis intersecting said shaft axis at right angles thereto and passing through the disk-carrying portion of the shaft, means interconnecting said yoke and disk so that swinging movement is imparted to the yoke by said disk in response to rotation of the shaft, shaft operating means through which force is applied directly to said shaft to rotate it through a partial revolution to either of two predetermined extreme positions in which the unit becomes self-locking as regards operation of the shaft by loads transmitted thereto through said yoke and disk, a member mounted to swing about a fixed pivotal axis, a collapsible strut connected between said member and said yoke adapted to be extended when the shaft of said unit is rotated to one of said extreme positions and to be collapsed when said shaft is rotated to the other of said extreme positions, the extension and collapse of said collapsible strut serving to operate said member to either of two definite positions.

12. In self-locking actuating mechanism of the character described, a motion-transmitting unit comprising a shaft, means mounting said shaft for rotation on its central longitudinal axis, an inclined disk carried by the shaft and fixed to rotate therewith, a yoke through which said shaft extends, means mounting said yoke for swinging movement about an axis intersecting said shaft at right angles thereto and passing through the disk-carrying portion of the shaft, motion-transmitting means interconnecting said yoke and disk so that swinging movement is imparted to the yoke by said disk in response to rotation of the shaft, said motion-transmitting means establishing an axis, intersecting and perpendicular to the yoke and shaft axes, on which the disk is rotatable relative to said yoke shaft, operating means through which force is applied directly to said shaft to rotate it through a partial revolution to either of two predetermined extreme positions in which the disk and yoke are disposed in a coplanar position in which loads transmitted to the shaft through said yoke and the motion-transmitting means interconnecting the yoke and disk are ineffective to rotate the shaft on its axis, a wheel-carrying strut mounted to swing about a pivotal axis located at one end thereof and carrying a landing wheel at the opposite end thereof and a collapsible nut-cracker strut connected between the wheel-carrying strut and said yoke, the arrangement being such that the nut-cracker strut is collapsed or extended to raise or lower the wheel-carrying strut in response to swinging movement imparted to said yoke by said disk during rotation of the shaft of the motion-transmitting unit, the operation of said unit being such that the yoke and disk are disposed in co-planar relationship when the wheel-carrying strut is fully raised and are also disposed in co-planar relation when the wheel-carrying strut is fully lowered.

13. In self-locking actuating mechanism of the character described, a motion-transmitting unit comprising a shaft, means mounting said shaft for rotation on its central longitudinal axis, an inclined disk carried by the shaft and fixed to rotate therewith, a yoke through which said shaft extends, means mounting said yoke for swinging movement about an axis intersecting said shaft axis at right angles thereto and passing through the disk-carrying portion of the shaft, motion-transmitting means interconnecting said yoke and disk so that swinging movement is imparted to the yoke by said disk in response to rotation of the shaft, said motion-transmitting means establishing an axis, intersecting and perpendicular to the yoke and shaft axes, on which said disk is rotatable relative to the yoke, a member mounted to swing about a fixed pivotal axis located at one end thereof, a collapsible strut connected between said member and said yoke for operating said member in response to swinging movement of said yoke, a lever arm rigidly attached to said member at the pivoted end thereof and a hydraulic jack operatively connected to said lever arm and to the shaft of said motion-transmitting unit.

14. A motion-transmitting unit as set forth in claim 13, in which the hydraulic jack is operatively connected to said shaft and to said member so that, in the operation of said unit, the load applied by the jack is initially effective to operate only the shaft of the motion-transmitting unit but is subsequently distributed between the shaft of the motion-transmitting unit and the lever of said member to impart simultaneous motion to said shaft and said member.

15. Mechanism of the character described comprising a shaft, means mounting said shaft for rotation on its central longitudinal axis, an inclined disk carried by the shaft and fixed to rotate therewith, a yoke through which said shaft extends, means mounting said yoke for swinging movement about an axis intersecting said shaft axis at right angles thereto and passing through the disk-carrying portion of the shaft, motion-transmitting means interconnecting said yoke and disk so that swinging movement is imparted to the yoke by said disk in response to rotation of the shaft, said motion-transmitting means establishing an axis, intersecting and perpendicular to the yoke and shaft axes, on which said disk is rotatable relative to the yoke, a member mounted to swing about a fixed pivotal axis, a collapsible strut connected between said member and said yoke for operating said member in response to swinging movement of said yoke, and means for rotating said shaft.

16. In a self-locking actuating mechanism of the character described, a motion transmitting unit comprising a shaft, means mounting said shaft for rotation on its central longitudinal axis, an inclined disk carried by the shaft and fixed to rotate therewith, a yoke through which said shaft extends, means mounting said yoke for swinging movement about an axis intersecting said shaft axis at right angles thereto and passing through the disk-carrying portion of the shaft, means interconnecting said yoke and disk so that swinging movement is imparted to the yoke by said disk in response to rotation of the shaft, said means including a ring rotatably secured to the peripheral portion of the disk, and adjustable ring-engaging stops carried by said yoke and engageable with the ring to prevent continued rotation of the shaft in either direction when the disk and yoke are disposed in a predetermined relative position.

ARNOLD G. PARKER.

REFERENCES CITED

The following references are of record in the file of this patent:

UNITED STATES PATENTS

| Number | Name | Date |
|---|---|---|
| 1,026,728 | Williams | May 21, 1912 |
| 2,344,797 | Briggs et al. | Mar. 21, 1944 |
| 2,371,442 | Hammond | Mar. 13, 1945 |